Oct. 20, 1931. T. A. BRYSON 1,828,096
CENTRIFUGAL PROCESS AND MECHANISM
Original Filed June 14, 1929 2 Sheets-Sheet 2
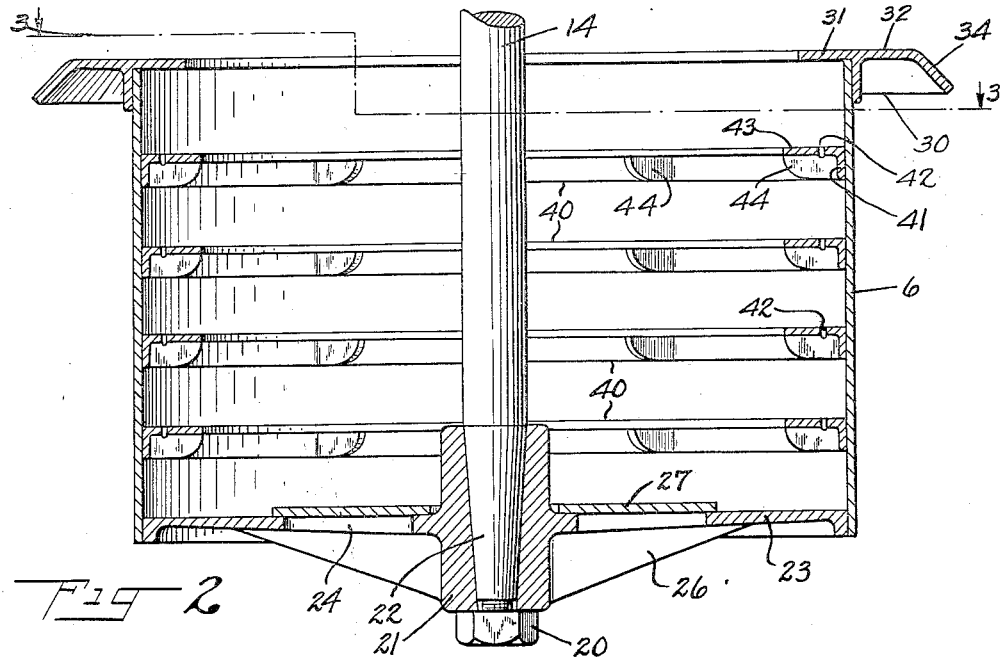
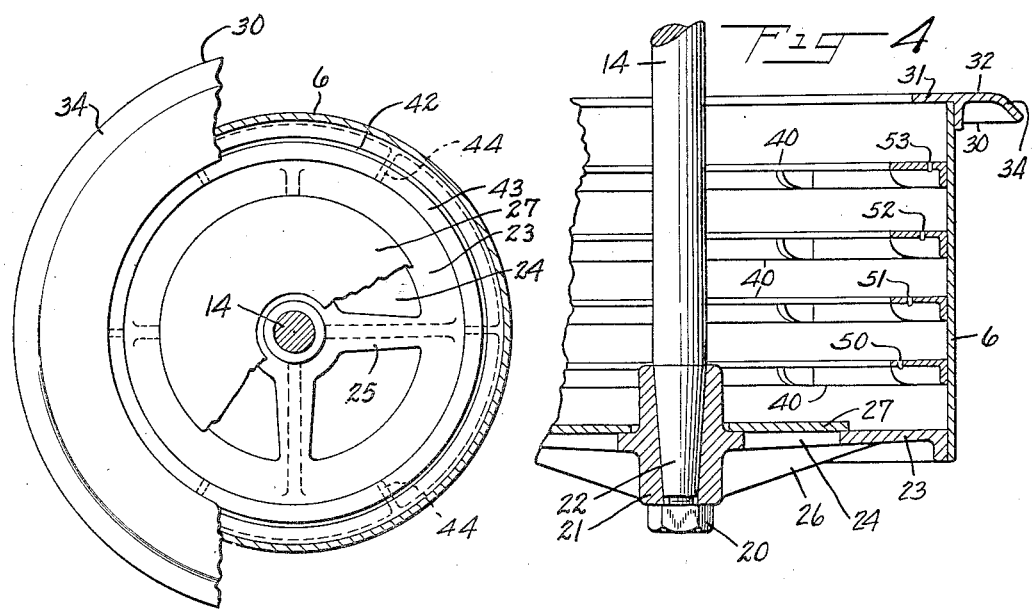

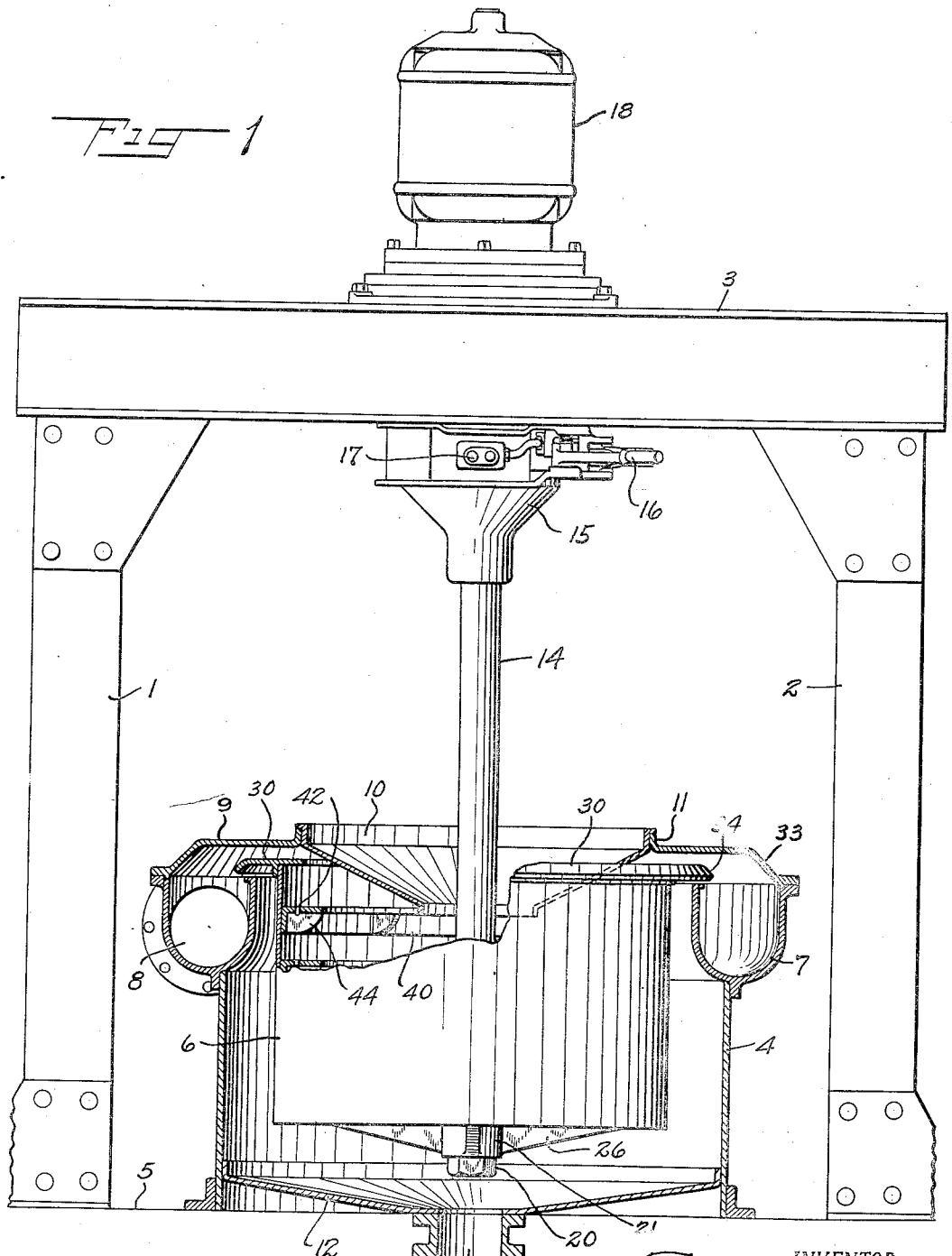

Patented Oct. 20, 1931

1,828,096

UNITED STATES PATENT OFFICE

TANDY A. BRYSON, OF TROY, NEW YORK

CENTRIFUGAL PROCESS AND MECHANISM

Application filed June 14, 1929, Serial No. 370,967. Renewed August 18, 1930.

The invention relates to a novel and useful centrifugal process and mechanism for separating or purifying a fluent intermixture containing impurities of both greater and less specific gravity than that of an intermediate product to be purified, in certain aspects especially adapted for the efficient purification of paper pulp liquor.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a central, vertical section through a centrifugal separator embodying the invention, with the frame and certain other parts in elevation;

Fig. 2 is a central vertical section through a centrifugal drum, showing a preferred embodiment of the invention;

Fig. 3 is a top plan of the drum shown in Fig. 2, with parts shown in horizontal section, taken on line 3—3 of Fig. 2;

Fig. 4 is a fragmentary central vertical section through a drum, showing a modified arrangement of orifices in the horizontal baffles; and Fig. 5 is an enlarged fragmentary detail in vertical section, showing a modified form of baffle mounting, permitting removal and replacement of baffles.

The invention is broadly directed to providing an improved process and mechanism for centrifugally purifying a product of intermediate specific gravity which contains impurities of both greater and less specific gravities. The invention is applicable to liquid intermixtures and to a liquid or liquids containing solid particles in suspension. While in no sense limited thereto, the invention finds an especially efficient application in the purification of a liquid-solid intermixture which contains a relatively small mass of impurities of greater and lesser specific gravities which are difficult of separation by known methods.

The invention is particularly applicable to the purification of paper pulp, which contains impurities both heavier and lighter than the pure paper pulp, and which cannot be satisfactorily eliminated by straining or filtering. The purification of paper pulp presents a particularly difficult separating problem. The pulp liquid usually contains impurities of greater specific gravity, such as particles of sand and undigested knot particles, which must be eliminated. Paper pulp also contains impurities of less specific gravity than the pure pulp, such as flotant particles of rubber, etc. Furthermore, in the purification of paper pulp, it is important that the fibrous paper particles be prevented from matting or felting during the separating operation and that matted bunches of fiber be broken up.

The present invention provides a process and mechanism for thoroughly and rapidly purifying paper pulp liquid, or other fluid containing heavier and lighter impurities, by the application of controlled and directed centrifugal force, whereby the pure product is caused to occupy a radially intermediate position relative to the heavier and lighter impurities, and then progressively purifying said intermediate product by progressively eliminating the heavier and lighter impurities. The pure product of intermediate specific gravity is preferably subjected to successive applications of centrifugal action, during which the impurities are progressively separated and collected on either side of the intermediately-disposed mass of partially purified material. In its passage through the successive stages of purification, the velocity of flow of the partially purified intermediate product is preferably varied to enhance the effectiveness of the separating action upon the entrained impurities.

In the present preferred practice and embodiment of the invention, a mass of fluent intermixed solid and liquid material to be treated is fed to a rotating centrifugal drum of the imperforate bowl type, and the material builds up against the inner wall of the drum to form a hollow cylinder of fluid. Due to the action of centrifugal force upon the particles of varying specific gravities, the purest particles, or those of intermediate specific gravity, take up a radially intermediate position in the liquid-wall, while the heavier and lighter impurities move radially outwardly and inwardly, respectively, to occupy positions near the outer and inner peripheries of the cylindrical liquid wall.

In carrying out the further steps of the process, the relatively pure, intermediate layer of paper pulp or the like is permitted to flow axially and preferably upwardly, while the radially inwardly and outwardly-disposed layers or sections of the liquid wall, which contain the lighter and heavier impurities, respectively, are restrained from axial flow. The axial flow of the relatively pure intermediate layer or stream is controlled to take place in a series of steps or phases, said stream being passed through a series of compartments or sub-areas in the hollow cylinder of material, and in each compartment a further purification takes place.

The intermediate and relatively pure material is preferably withdrawn from one compartment into the next at approximately the zone of maximum purity. The withdrawal of the relatively pure material is effected at a relatively high velocity and in a relatively thin stream, but during its passage through the subsequent compartment, the axial velocity of the stream is lowered and the centrifugal action on the entrained impurities is thereby enhanced. By successively passing the partially purified stream of material at varying velocities through a series of such compartments, the intermediate product is progressively purified very thoroughly and rapidly. The impurities, on the other hand, are prevented from axial travel and are held within the centrifugal drum until a sufficient quantity thereof is collected to require discharge.

The present preferred mechanism for effecting the hereinbefore-described purifying action comprises an imperforate centrifugal drum having its inner periphery divided into a plurality of compartments or pockets disposed axially thereof, and having intermediate discharge openings, of preferably annular form, opening from each compartment into that above. The compartments are preferably formed by annular baffles projecting radially inwardly from the inner peripheral surface of the drum. The upper and open end of the drum is provided with an inwardly-extending discharge lip, which determines the radial depth of the wall of material in the drum. The baffles preferably extend radially inwardly a greater distance than the discharge lip, whereby the baffles project through the inner wall of the hollow cylindrical body of material and thus serve to prevent axial flow of the lighter impurities as well as to retain the heavier impurities disposed near the periphery.

The remaining objects and features of the invention will be set out later herein in connection with the detailed description, and it will be understood that the foregoing description and the following detailed description as well are explanatory and exemplary and not restrictive of the invention.

Referring now in detail to the present preferred embodiment, illustrated by way of example in the accompanying drawings, the invention is applied to a centrifugal machine of the overhead suspended type, although so far as concerns the necessary features of the invention, it may be applied to other types of centrifugals.

In said illustrated form, a supporting frame is provided having uprights 1 and 2 and a horizontal cross piece 3 supported upon the upper ends thereof. The centrifugal extractor comprises broadly a cylindrical casing 4, which is preferably mounted in stationary position upon the floor. The casing may be provided with any suitable means for carrying away or discharging the purified separated material which is discharged from the drum or bowl 6 thereinto. The embodied discharge means comprises an annular gutter 7 secured to the upper rim of the casing 4 and surrounding the upper portion of the rotatable drum 6. The gutter is provided with a tangential outlet 8 for ejecting the discharged material.

A cover ring 9 is connected to the upper and outer edge of the gutter and projects inwardly to cover the top thereof. A charging or feeding funnel 10 is connected at its upper and outer periphery to the inner flange 11 of the ring 9, and projects downwardly and inwardly into the upper central portion of the bowl 6.

Means are provided for receiving and permitting discharge of impurities from the drum. As embodied, the casing 4 is provided with a downwardly and inwardly sloping bottom 12 having a centrally disposed waste outlet 13 for disposing of impurities discharged from the bottom of the drum in a manner to be hereinafter described.

The drum or bowl 6 is suspended from and rotated by a shaft 14, which shaft is preferably resiliently mounted, to have also angular or gyratory motion with an unbalanced load, by any suitable supporting bearing, such bearing having connected therewith, or adjacent thereto, any suitable or desired driving means for the shaft 14. The enclosing housing for the bearing is shown at 15, and an electric motor 18 is mounted on the cross piece 3 in line with the shaft 14 and having suitable driving connection therewith. A brake mechanism 16 is provided for the spindle shaft, preferably mounted as shown below the cross-piece. Also mounted on the housing 15 are motor control push buttons 17.

Referring now to the structure of the centrifugal drum or bowl 6, the bowl is attached to the spindle 14 for rotation therewith by a nut 20 having a screw-threaded attachment to the bottom end of the shaft, and supporting the hub 21 of the bottom of the drum. The interior of the hub 21 is conical to have a close tapered fit on the lower conically tapered end 22 of the shaft. The hub 21 forms an integral part of the bottom 23 of the drum, which bottom is provided with a plurality of segmental openings 24 formed about the hub and divided by radial arms or spokes 25 which connect the annular web 23 of the bottom to the hub 21. The bottom structure is further strengthened by flanged webs 26 formed beneath the spokes 25 and sloping upwardly and outwardly to merge with the web 23.

The openings 24 in the bottom of the drum provide means for removing waste and impurities which have collected in the drum during the separating operation, the discharged matter falling onto the sloping bottom 12 of the casing and being discharged through the centrally-disposed orifice 13. During the rotation of the drum the openings 24 are closed by a removable annular plate 27, which may be removed when the drum is stopped at the end of a run.

Referring now to the internal structure of the drum, the walls thereof are formed by a cylindrical, smooth, imperforate shell 6. A liquid controlling and discharge lip is provided for determining the thickness of the hollow cylinder of material maintained in the basket during the rotation thereof under a regulable feed, said lip comprising an annular flange 30 fitting about the upper rim of the shell 6 and having a horizontal, radially inwardly-extending portion 31 which determines the radial depth of the hollow cylinder of liquid and over which the purified material flows to discharge.

Means are provided for cooperating with the lip 31 for directing and controlling the discharge of the purified material. As embodied, the member 30 is provided with a horizontal, outwardly-extending flange 32, which cooperates with the casing cover 9 to assure complete discharge of the purified material into the collecting gutter 7. For this purpose, the cover 9 has a downwardly and outwardly-extending portion 33, while the flange 32 is similarly provided with a cooperating lip 34 which overhangs the inner rim of the gutter 7 and prevents any of the discharging material from falling into the interior portion of the casing 4. It will be clear that the overflowing and discharging material will fly out practically horizontally from the upper surface of the lip 31 and strike the downwardly sloping portion 33 of the casing cover 9, while the overhanging lip 34 serves to prevent escape of any of the material so discharged from the gutter.

In the embodied form of means for controlling the hereinbefore described flow and action of the material during the purifying action, a plurality of compartments or pockets are provided for effecting a successive and progressive purification of the material. As embodied, a plurality of flat annular baffle plates 40, preferably horizontally-disposed, divide the internal periphery of the drum into a series of compartments, the outer periphery of these baffles abutting on the vertical cylindrical inner wall 6 of the drum. The baffle plates are preferably of angle section as shown, the vertically-extending arms 41 thereof being suitably fastened to the inner surface of the drum.

The width or radial extent of the baffles is preferably such that they extend radially inwardly a greater distance than the flange or lip 31, and when so constructed they constitute means for preventing axial flow or currents in the material undergoing centrifugal action, thereby preventing intermixture and interflow of the inner, intermediate and outward or peripheral layers or radial zones of fluid in the hollow cylindrical wall of material. The flange or lip 31, as indicated, substantially determines the depth or radial thickness of the wall of liquid within the bowl or drum 6, and when the baffles 40 extend inwardly a greater radial distance than the lip or flange 31, there is no axial flow of material internally over or past a baffle.

The precise number of baffles employed, or rather the number of compartments provided along the inner wall of the drum, broadly considered, is immaterial, but may be varied according to the nature and requirements of the material to be treated. In general, a greater number of compartments will give a more intensive purifying action to the materials by increasing the number of successive separating treatments. While I have illustrated a plurality of compartments, it will be noted that a hollow mass of material being treated is exposed interiorly which facilitates observation of the progress of the process. At the same time the baffles which are comparatively narrow, provide for access to the compartments and cleaning thereof, and discharge of material therefrom.

In the embodied form of means for permitting axial flow of an intermediately-disposed zone or section of the cylindrical wall of fluent material, while restraining the radially inwardly and outwardly disposed impurities, each baffle 40 is provided with an intermediately located and preferably relatively narrow opening or openings for permitting axial egress of radially intermediate material from one compartment to the next. The openings 42 are preferably annular and divide each baffle 40 into two annular portions, the inner portion 43 being attached to the outer and supported by a number of inwardly projecting brackets 44, which are relatively narrow and do not materially obstruct the passage of material through the openings.

It will be understood, however, that the invention is not limited to a single opening in the baffle nor to any particular form thereof.

The viscosity, or compact and imperfectly fluid character, of paper pulp, when subjected in radially deep masses to centrifugal force, interferes with the flotation and sedimentation of impurities. In other words, the impurities are restricted in their movement away from the contacting surfaces of the stream and the relatively quiescent masses of pulp, hence, the pulp, which is retained in the compartments, is imperfectly charged with impurities, and while the contacting surfaces may become so charged with impurities that discharge of the mass is necessary, the areas remote from the contacting surfaces are not highly charged and the discharge of the mass represents a large proportional loss of the clean or pure pulp. By using radially shallow compartments for retention of a mass as a receptacle for impurities, such mass is maintained relatively small and thin to provide a proportionally large contacting area. I have found in practice that the radial thickness of the mass of material should be less than one sixth of the radius of the drum or cylinder.

In the present preferred embodiment of the invention, as illustrated in Figs. 1 and 2, the annular openings 42 in the superposed baffles 40 are preferably located substantially directly one above the other or in the same vertical line, and all the openings 42 are preferably at a greater radial distance from the center of the drum than the inner edge of the discharge lip 31.

In the operation of the process and mechanism of the invention the fluent intermixture of material is fed into the funnel 10 and falls onto the bottom of the spinning drum. The material immediately flies to the periphery of the drum, and after filling the compartment under the lowermost baffle out to the orifice 42, spills through the orifice and begins to fill the next compartment and so on until the material builds up and starts to overflow the inner edge of the lip 31. In this way a hollow cylinder of the fluent material is formed, having a radial depth substantially equal to the inward extent of the lip 31 as indicated by the dotted line Fig. 2, although the radial depth of the cylinder in the lower compartments may be somewhat greater, depending upon the rate of feed of the material to the drum.

When the hollow cylinder of material has been built up as described, it will be maintained by continuing to feed material into the bottom of the drum, and the rate of discharge of purified material over the lip 31 will be equal to the rate of feed. Under these conditions, and by virtue of centrifugal action, the materials in each pocket or compartment will arrange themselves according to their specific gravities, the heaviest particles finding their way to the periphery of the drum and the lightest impurities "floating" on the inner surface of the hollow cylinder. The intermediate particles of the fluent material, which in the case of paper pulp, for instance, are the purest, will occupy a radially intermediate position in the liquid wall. Since the orifice 42 is located at this radially intermediate position, the particles which escape axially into the vertically adjacent compartment will be those of maximum purity, while the outer and inner portions of the baffle 40 will retain the heavier and lighter impurities, respectively, and prevent their axial escape. It will be clear that a corresponding operation takes place in each compartment, the intermediately located and therefore purest fluent particles being forced by the axial pressure into the compartment above.

Depending upon the rate of feed of the materials, the radial depth of the fluid cylinder in the compartments below the top-most may be somewhat greater than that indicated by the dotted line from lip 31. That is, the pressure created by the feed and the restricted escape of the material through the orifices may increase the radial depth of the cylinder and cause an appreciable "bulge" of the mass of fluid in the lower compartments.

By virtue of the narrowness of the orifices 42, the escape of material from one compartment to the next takes place in a very thin stream and at a relatively high velocity. As this stream moves into the comparative quiet of the compartment above, it flares or "mushrooms" radially due to the rapid reduction in velocity. Due to this sudden change in axial velocity, the centrifugal action in the compartment is enhanced, or, rather, the radial components of centrifugal force become relatively greater as the axial component decreases. Hence, any impurities contained in the axially moving stream, and which are heavier or lighter than the pure particles of said stream, are urged to move outwardly or inwardly respectively and diverge from said axial stream.

It will be seen that the action hereinbefore described is very efficacious in purifying the intermediate stream of material, because any heavier or lighter particle which is improperly located in said intermediate stream will have to travel in a straight axial line for a comparatively long distance vertically to retain its intermediate location and to reach and escape through the next orifice into the adjoining compartment. During this travel the impure particle must resist the diverting tendency of centrifugal force. A further advantage inherent in the thin axial stream, in addition to its tendency to "mushroom" or lose velocity and expand, is the fact that any particle of impurity contained therein, whether heavy or light, has a very small distance to veer radially before it is swept out of line and blocked from reaching the next orifice.

It will be clear from the action described that the axially moving stream of intermediately located particles undergoes a progressive purification while passing from one compartment to the next. In each compartment a further elimination of impurities takes place and the pure intermediate product passes axially in an increasingly purified condition, while the heavier and lighter impurities are retained by the outer and inner imperforate portions of the baffles 40.

A further advantage of the process and structure described, which is particularly important in the purification of paper pulp, results from the passage of the purifying pulp through a plurality of restricted orifices. The pulp usually contains "bundles" or matted groups of fiber. The passage of these bundles through the narrow openings greatly aids in breaking them up and thus rendering the pulp more homogeneous and also freeing entrained impurities.

In the purification of the axially-flowing stream of material, the separation of impurities is also promoted by the action set up by the frictional contact of the particles in the radial borders of the axial stream with the fibrous masses retained on either side thereof. The relatively stationary fibrous masses act upon the sides of the submerged axial stream to set up frictional disturbances or turbulences which tend to liberate the particles of impurities in said stream. There is thus a combing action by the relatively stationary masses upon the borders of the stream which gleans the impurities and frees them for centrifugal movement. This combing or frictional disturbance is most pronounced in the vicinity of the orifices where the stream narrows and passes rapidly between the inner and outer walls or layers of impurities. In other words, at the submerged orifices the inner and outer walls or masses of pulp are brought closely together and the axially moving stream is subjected to a virtual straining action.

It will be understood that the foregoing statements of theory are my present best understanding from observation and successful results of the invention, but I do not wish to be bound thereby as to the exact nature of the different occurrences and stages of the process.

Referring now to the modified form of the invention shown in Figs. 4 and 5, means may be provided for accommodating the separating action to a pulp or other fluid intermixture which contains a relatively great proportion of heavier or lighter impurities. For instance, in some paper pulps, there is a relatively large proportion of heavier and practically solid impurities, which tend to separate early in the process and cake or pack against the periphery of the drum. In such case, with the arrangement shown in Fig. 2, the lower compartments might tend to pack up with solids and finally clog the openings before the upper compartments were so congested.

To provide for this contingency, the annular orifice 50 shown in Fig. 4 is located relatively near the inner circumference of the lower baffle, while the superposed orifices 51, 52 and 53 are set respectively nearer the periphery of the drum. By virtue of this arrangement, the solids which settle in the lower compartments can build up to a relatively great extent without interfering with the efficient operation of the process.

Furthermore, as the axial stream of materials flows upwardly through the orifices, the general gravity content of the stream or mass becomes progressively lower due to the removal of the heaviest impurities. The lighter impurities, on the other hand, which are more liquid in their nature, have a greater tendency to escape upwardly and overflow the top baffle or slip through the upper orifices and over the lip 31 to escape with the pure product. By locating the upper orifices progressively nearer the periphery of the drum, a greater resistance is offered to the passage of the light impurities by the wider, inner portion of the baffle and hence the chance of escape of floating impurities at the top of the drum is rendered remote.

Means may be provided for varying the width or radial position, or both, of the annular orifices, to accommodate mixtures of different relative proportions of impurities and of different specific gravity contents. As embodied, and shown in Fig. 5, the inner and outer baffle rings 43 and 55 may be removably attached to the brackets 44 by set screws 56 or other suitable and readily detachable means. By virtue of this arrangement, the inner and outer rings 43 and 55 may be removed and replaced by rings of different widths so that the radial location and width of the orifice 42, may be changed in each baffle as desired.

The invention in its broader aspects is not limited to the specific mechanisms shown and described but departures may be made therefrom within the scope of the accompanying claims without departing from the principles of the invention and without sacrificing its chief advantages.

What I claim is:—

1. The process of purifying fluent material containing impurities of greater and less specific gravity than that of an intermediate product to be purified which comprises rotating a mass thereof to form a hollow cylindrical body of fluid, the radial thickness of material being less than one sixth of the radius of the cylinder flowing axially a radially intermediate and relatively pure portion of the fluent material, and preventing axial movement of the radially inner and outer portions of the fluent material.

2. The process of purifying fluent material containing impurities of greater and less specific gravity than that of an intermediate product to be purified which comprises rotating a mass thereof to form a hollow cylindrical body of fluid, the radial thickness of material being less than one sixth of the radius of the cylinder flowing axially a radially intermediate and relatively pure portion of the fluent material, in a relatively thin stream, successively diverting impurities from said stream by centrifugal action, and preventing further axial movement of said diverted impurities.

3. The process of purifying fluent material containing impurities of greater and less specific gravity than that of an intermediate product to be purified which comprises rotating a mass thereof to form a hollow cylindrical body of fluid, the radial thickness of material being less than one sixth of the radius of the cylinder flowing axially a radially intermediate and relatively pure portion of the fluent material, and preventing axial movement of the radially inner and outer portions of the fluent material at a plurality of loci axially of the fluid cylinder.

4. The process of purifying fluent material containing impurities of greater and less specific gravity than that of an intermediate product to be purified which comprises rotating a mass thereof to form a hollow cylindrical body of fluid, the radial thickness of material being less than one sixth of the radius of the cylinder flowing a radially intermediate and relatively pure portion of the fluent material in an axially-directed stream, successively withdrawing impurities from said stream by centrifugal action, and successively imposing axial restrictions upon said impurities.

5. The process of purifying paper pulp containing impurities of greater and less specific gravity than that of an intermediate product to be purified which comprises rotating a mass thereof to form a hollow cylindrical body of fluid, the radial thickness of the mass of material being less than one sixth of the radius of the cylinder flowing a radially intermediate, relatively pure portion of the paper pulp in a substantially axial path, progressively diverting impurities from the axially-moving stream by centrifugal action, and enhancing the diverting action by varying the velocity of said stream.

6. The process of purifying fluent material containing impurities of greater and less specific gravity than that of an intermediate product to be purified which comprises rotating a mass thereof to form a hollow cylindrical body of fluid, the radial thickness of the mass of material being less than one sixth of the radius of the cylinder flowing a radially intermediate, relatively pure portion of the fluent material in a substantially axial path, progressively diverting impurities from the axially-moving stream by centrifugal action, and enhancing the diverting action by alternately relatively widely varying the velocity of said stream.

7. The process of purifying fluent material containing impurities of greater and less specific gravity than that of an intermediate product to be purified which comprises rotating a mass thereof to form a hollow cylindrical body of fluid, the radial thickness of the mass of material being less than one sixth of the radius of the cylinder flowing a radially intermediate, relatively pure portion of the fluent material in a stream directed in a substantially axial path, and successively varying the velocity of said stream.

8. The process of centrifugally purifying paper pulp which comprises passing it successively through a series of radially shallow compartments and withdrawing it axially from one compartment to the next, the point of withdrawal from each compartment being substantially coincident with that of its highest degree of purity.

9. The process of centrifugally purifying paper pulp which comprises subjecting a mass of pulp liquid to centrifugal action axially, withdrawing the purest portion of the mass at a relatively high velocity while retaining the impurities, reducing the velocity of the portion so withdrawn and separating further impurities therefrom by centrifugal action, and continuing said steps of withdrawal and separation to progressively purify the pulp by a succession of said steps, and discharging the purified pulp.

10. The process of purifying paper pulp which comprises subjecting a hollow cylindrical mass thereof to centrifugal action, the thickness of said cylindrical mass being less than one sixth of the radius thereof, passing axially a portion of the mass at relatively high velocity through a series of orifices alternately into low-velocity areas, and collecting impurities in the low-velocity areas.

11. The process of purifying paper pulp which comprises subjecting a hollow cylindrical mass thereof to centrifugal action, the thickness of said cylindrical mass being less than one sixth of the radius thereof, passing axially the purest portion of the mass at relatively high velocity through a series of orifices alternately into low-velocity areas, and collecting impurities in the low-velocity areas.

12. The process of purifying paper pulp containing heavier and lighter impurities which comprises rotating a mass thereof in a centrifugal drum to form a hollow cylindrical liquid body, causing the heavier impurities to move radially outwardly and the lighter impurities radially inwardly whereby the relatively pure paper pulp occupies a radially intermediate position, moving the intermediate pulp in an axially-directed stream, and progressively purifying the pulp by withdrawing heavier and lighter impurities from said stream by successive applications of centrifugal action.

13. The process of purifying paper pulp containing heavier and lighter impurities which comprises rotating a mass thereof in a centrifugal drum to form a hollow cylindrical liquid body, causing the heavier impurities to move radially outwardly and the lighter impurities radially inwardly whereby the relatively pure paper pulp occupies a radially intermediate position, moving the intermediate pulp in an axially-directed stream, at alternately high and low velocities, and progressively purifying the pulp by withdrawing heavier and lighter impurities from said stream by successive applications of centrifugal action.

14. The process of purifying paper pulp containing heavier and lighter impurities which comprises rotating a mass thereof in a centrifugal drum to form a hollow cylindrical liquid body, causing the heavier impurities to move radially outwardly and the lighter impurities radially inwardly whereby the relatively pure paper pulp occupies a radially intermediate position, moving the intermediate pulp in an axially-directed stream, through a series of relatively narrow orifices whereby the velocity of the stream alternately varies from a relatively high to a relatively low velocity, and progressively purifying the pulp by withdrawing heavier and lighter impurities from said stream by successive applications of centrifugal action in the low velocity areas between the orifices.

15. A centrifugal separator for paper pulp including in combination an imperforate rotatable drum, means for rotating the drum, means for maintaining therein a hollow, substantially cylindrical and interiorly exposed body of pulp liquid undergoing purification, means for inducing axial flow of a radially intermediate portion of said cylindrical body, and means for successively removing impurities radially inwardly and outwardly of said intermediate portion by centrifugal action from said axially-flowing pulp liquid at a plurality of points along its path of flow and means for restricting the axial flow of impurities thus removed.

16. A centrifugal separator for paper pulp including in combination an imperforate rotatable drum, means for rotating the drum, means for maintaining therein a hollow, substantially cylindrical and interiorly exposed body of pulp liquid undergoing purification, means for inducing axial flow of a radially intermediate portion of said cylindrical body, means for alternately increasing and decreasing the axial velocity of said axially-flowing pulp liquid, and means for collecting and retaining impurities within and without said intermediate portion during the periods of decreased velocity.

17. A centrifugal separator including in combination an imperforate rotatable drum, the inner portion thereof being divided into a plurality of superposed annular compartments, the compartments having a width less than one sixth of the radius of the drum and connected one with the other by an opening substantially annular and narrow relative to the radial width of the compartment.

18. A centrifugal separator including in combination an imperforate rotatable drum, the inner portion thereof being divided into a plurality of superposed annular compartments, the compartments having a width less than one sixth of the radius of the drum and connected one with the other by a substantially annular opening.

19. A centrifugal separator including in combination an imperforate rotatable drum, the inner portion thereof being divided into a plurality of superposed annular compartments, the compartments having a width less than one sixth of the radius of the drum and connected one with the other by a substantially annular opening radially intermediate of the compartment.

20. A centrifugal separator including in combination an imperforate rotatable drum, the inner portion thereof being divided into a plurality of superposed annular compartments, the compartments having a width less than the radius of the drum and connected one with the other by a substantially annular opening, the openings between successive compartments being substantially at the mid-width radially of the compartments.

21. A centrifugal separator including in combination an imperforate rotatable drum, the inner portion thereof being divided into a plurality of superposed annular compartments, the compartments having a width less than the radius of the drum and connected one with the other by a substantially annular opening, and means for varying the size of the openings between successive compartments.

22. A centrifugal separator including in combination an imperforate rotatable drum, the inner portion thereof being divided into a plurality of superposed annular compartments, the compartments having a width less than the radius of the drum and connected one with the other by a substantially annular opening, and means for varying the radial position of the openings between successive compartments.

23. A centrifugal separator including in combination an imperforate rotatable drum, the inner portion thereof being divided into a plurality of superposed annular compartments, the compartments having a width less than the radius of the drum and connected one with the other by a substantially annular opening, the openings between successive compartments being located progressively nearer the periphery of the drum.

24. A centrifugal separator including in combination an imperforate rotatable drum, the inner portion thereof being divided into a plurality of superposed annular compartments, the compartments having a width less than the radius of the drum and connected one with the other by a substantially annular opening, the lowermost opening being spaced farthest from the periphery of the drum.

25. A centrifugal separator including in combination an imperforate rotatable drum, the inner portion thereof being divided into a plurality of superposed annular compartments, the compartments having a width less than the radius of the drum and connected one with the other by a substantially annular opening, the lowermost opening being spaced farthest from the periphery of the drum and the openings between successive compartments being located nearer the periphery of the drum progressively upwardly of the drum.

26. A centrifugal separator including in combination an imperforate rotatable drum, the inner portion thereof being divided into a plurality of superposed annular compartments, the compartments having a width less than one sixth of the radius of the drum and connected one with the other by an opening which is narrow relative to the radial width of the compartment.

27. A centrifugal separator comprising a drum mounted for rotation on its axis, the drum having an imperforate cylindrical side wall and fitted at one end with an inwardly extending lip to determine the thickness of the hollow cylinder of material to be treated, said cylindrical space being divided into a plurality of compartments by baffles extending transversely from the inner surface of the drum radially inward further than said lip but less than one sixth of the radius of said drum, said baffles having substantially annular orifices therein, the orifices being narrow relative to the said hollow cylinder, coaxial therewith, and wholly within the confines thereof.

28. A centrifugal separator comprising an imperforate rotatable drum, a series of annular baffles extending inwardly from the inner surface thereof, and forming a series of compartments open radially interiorly the spaces between the baffles being connected one with the other by an opening substantially annular and narrow relative to the radial width of the baffle, the openings being placed substantially at the mid-width of the baffle.

29. A centrifugal separator comprising an imperforate rotatable drum, a series of transverse annular baffles extending inwardly from the inner surface of the drum, the spaces between the baffles being connected one with the other by an opening substantially annular and narrow relative to the radial width of the baffle, the openings in successive baffles being placed progressively nearer the periphery of the drum.

30. A mechanism for separating impurities of both heavier and lighter specific gravity from a solid-liquid intermixture of intermediate specific gravity including in combination an imperforate drum mounted for rotation on its central axis, means for rotating the drum, means for maintaining therein a hollow, substantially cylindrical body of the intermixture including an inwardly-extending lip at one end of the drum for determining the thickness of the cylindrical body, the width of said lip being less than one sixth of the radius of the drum, a plurality of annular baffles mounted on the inner peripheral surface of the drum and extending radially inwardly farther than said lip, and a relatively narrow, substantially annular orifice in each baffle.

31. The process of purifying paper pulp liquid which comprises rotating a mass thereof to form a hollow, cylindrical body wherein the pure pulp occupies a radially intermediate zone, flowing a relatively narrow portion of said zone axially in a thin stream at successively varying velocities while axially restraining the remainder of said cylindrical body and enhancing the purifying action of centrifugal force by subjecting said axial stream to the frictional brushing action of the axially-restrained fibrous masses at the borders of said stream.

32. The process of purifying paper pulp which consists in maintaining by centrifugal force a hollow cylinder of pulp mass which is thin relatively to the radius of the cylinder and passing axially therethrough and intermediate submerged stream of impure pulp, moving the impurities in said stream to the borders thereof by centrifugal force, and insnaring and retaining said impurities in the fibrous contacting surfaces of said pulp mass.

33. The process of purifying paper pulp which consists in maintaining by centrifugal force a thin hollow cylinder of pulp mass and passing axially therethrough a thin submerged stream of impure pulp, moving the impurities of said stream to the borders thereof and restraining their movement, and insnaring said impurities in the fibrous contacting surfaces of said pulp mass and removing by centrifugal force said insnared impurities from said contacting surfaces.

34. The process of purifying paper pulp which consists in rotating a mass of the pulp, inducing an axial flow of an intermediate layer of relatively pure material, confining an outer and an inner layer of relatively impure material, and thereby causing the confined layers to exert a brushing action on the pulp fibers of the relatively pure flowing material.

35. In a centrifugal separator, an imperforate drum fitted on its internal cylindrical surface with narrow circumferential shelves, at one end with an inwardly extending flange, said flange being of less extent then said shelves, at the other end with a second inwardly extending flange, said second flange being of greater extent than said shelves, said shelves being apertured at substantially their mid-width only.

In testimony whereof, I have signed my name to this specification.

TANDY A. BRYSON.